(No Model.)
A. J. PURYEAR.
HARROW.
No. 249,396.                    Patented Nov. 8, 1881.
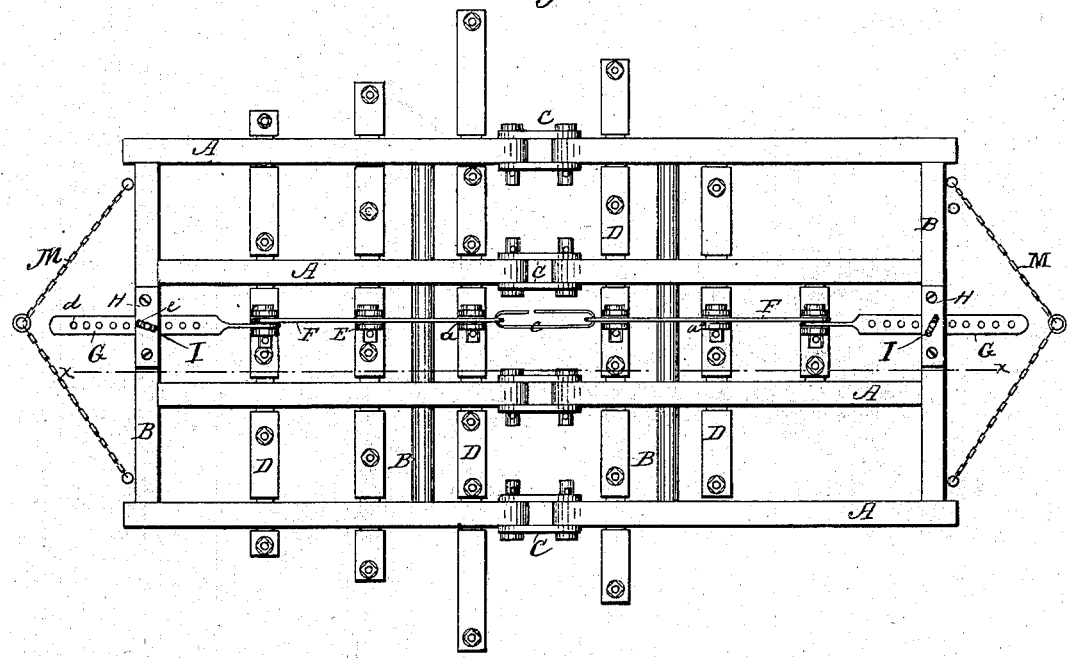
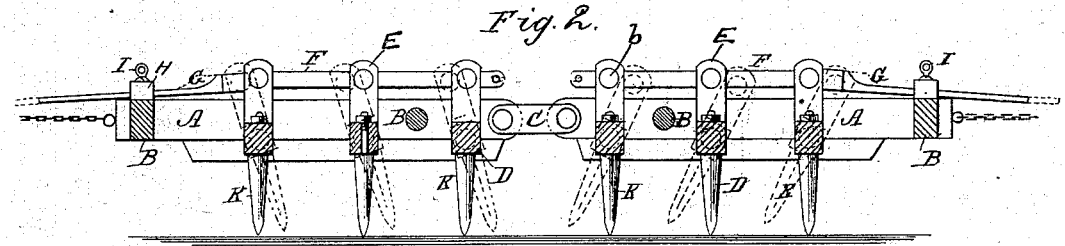
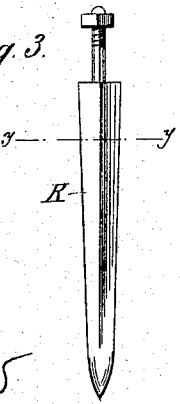
WITNESSES:
W. W. Hollingsworth
Solon C. Kemon
INVENTOR:
A. J. Puryear
BY
ATTORNEYS.

UNITED STATES PATENT OFFICE.

ANDREW J. PURYEAR, OF FRANKLIN, TENNESSEE.

HARROW.

SPECIFICATION forming part of Letters Patent No. 249,396, dated November 8, 1881.

Application filed May 6, 1881. (No model.)

*To all whom it may concern:*

Be it known that I, ANDREW JACKSON PURYEAR, a citizen of the United States, residing at Franklin, in the county of Williamson and State of Tennessee, have invented a new and useful Harrow, of which the following is a specification.

My invention relates to certain improvements in harrows of that class in which the teeth are fixed to parallel rocking bars, which are provided with locking devices for adjusting the inclination of the teeth; and it consists in the peculiar construction and arrangement of parts hereinafter described.

In the drawings, Figure 1 is a plan view of my improved harrow. Fig. 2 is a vertical longitudinal section of the same through the line $x\ x$ of Fig. 1. Fig. 3 is a view of one of the tines of the harrow, and Fig. 4 is a transverse section of the same through lines $y\ y$ of Fig. 3.

Similar letters of reference indicate corresponding parts throughout the views.

A represents the longitudinal, and B the transverse bars, which form the frame-work of the harrow. These are arranged in two sets and connected together by the links C, so that the size of the harrow may be diminished, when necessary, one-half, either by removing one of the halves, or by turning the same upward and over the operating part.

D are the transverse tine-bearing bars, journaled in the longitudinal bars A of the frame-work, and provided with the upwardly-extending arms E. In the extremities of said arms are formed slots $a$ and perforations $b$, the former to receive connecting-rods F, and the latter to accommodate pivots which pass through said arms and rods and connect them together. The rods F are connected by the link $c$, said link allowing the tine-bearing bars of both sections of the harrow to be adjusted simultaneously, while at the same time not preventing one section being doubled upon the other.

Pivoted to the arms of either end tine-bearing bar are the locking-bars G, which pass through the keepers H, and are provided with perforations $d$, corresponding with the perforations $e$ in the keepers, said locking-bars and keepers being locked in any desired position by the pins I.

K are the tines of the harrow, which are, in transverse section, of an elongated diamond shape and are bolted in the bars D so as to present their edges to the earth.

M are the ropes or rods by which the harrow is drawn.

To operate my improved harrow, the draft being applied at one end, the locking-pins I are withdrawn and the bars drawn in the proper direction until the tines have assumed the desired position, when the pins are replaced and the machine is ready for work. The form of the tines is such that the same wear of the earth which dulls the front edge sharpens the rear edge, so that by reversing the line of draft a sharp cutting-edge will be presented as long as the teeth last.

When it is desired to reverse the harrow it is only necessary to attach the draft to the opposite end, draw out the locking-pins, and adjust the tines in the manner already described.

It will be seen that by the peculiar construction of the harrow the tines in the two halves may be arranged independently of each other, and that one-half of it may be removed without in any way interfering with the adjustment of the teeth in the other half. It will also be seen that, if desired, the apparatus for adjusting the teeth may be used with advantage for cleansing the same of rubbish. The connecting-link C being removed, one-half the teeth may be turned backward, so that the earth will divest them of all rubbish, while the other half may remain in their normal position and do the harrowing. Finally, by the construction of the tines it will be seen that my improved harrow is especially adapted for use where deep harrowing is desired, or where new ground is being broken and it is necessary to divide the roots which interlace the soil.

Having thus fully described my invention, what I claim is—

In a harrow, the longitudinal parallel bars A A, having link-joints C in their middle transverse lines, combined with a series of transverse rocking bars, D, provided with teeth, and the connecting-rods F F, joined by a detachable link, $c$, at their inner ends, and having independent fastenings G H I at their outer ends, substantially as and for the purpose described.

ANDREW JACKSON PURYEAR.

Witnesses:
JAS. L. MCGAW,
W. C. CAMPBELL.